United States Patent [19]

Hartmann

[11] 4,442,989
[45] Apr. 17, 1984

[54] CABLE BEARER SYSTEM

[76] Inventor: Bernd Hartmann, Hülsbergstr. 51a, 4630 Bochum, Fed. Rep. of Germany

[21] Appl. No.: 196,486

[22] PCT Filed: Apr. 18, 1979

[86] PCT No.: PCT/DE79/00042
§ 371 Date: Dec. 18, 1979
§ 102(e) Date: Dec. 10, 1979

[51] Int. Cl.³ .................................................. F16L 3/00
[52] U.S. Cl. ........................................ 248/49; 52/167; 248/634
[58] Field of Search ................. 248/49, 55, 60, 68 R, 248/634, 633, 613, 632; 52/167

[56] References Cited

U.S. PATENT DOCUMENTS

| 1,905,596 | 4/1933 | Lewis | 248/49 |
| 2,308,969 | 1/1943 | Riesing | 248/613 |
| 3,119,588 | 1/1964 | Keats | 248/158 |
| 3,430,901 | 3/1969 | Cauvin | 248/632 X |
| 3,787,016 | 1/1974 | Laval | 248/68 R X |
| 3,923,277 | 12/1975 | Perrault | 248/68 R X |
| 3,963,205 | 6/1976 | Hageman | 248/55 |
| 4,023,684 | 5/1977 | Saul | 211/193 |
| 4,238,137 | 12/1980 | Furchak | 52/167 X |

FOREIGN PATENT DOCUMENTS

| 224731 | 12/1962 | Austria | 248/68 R |
| 857144 | 11/1952 | Fed. Rep. of Germany | 248/634 |
| 2253141 | 5/1974 | Fed. Rep. of Germany | |
| 989792 | 9/1951 | France | |
| 447842 | 3/1949 | Italy | 248/632 |
| 549083 | 11/1942 | United Kingdom | |
| 570243 | 6/1945 | United Kingdom | 248/613 |
| 1243015 | 8/1971 | United Kingdom | 248/633 |
| 2047520 | 12/1980 | United Kingdom | 248/68 R |

Primary Examiner—J. Franklin Foss
Attorney, Agent, or Firm—Jacobs & Jacobs

[57] ABSTRACT

For a cable bearing system, preferably I-shaped, bearers arranged vertically at intervals, one behind the other and several brackets fixed horizontally at the sides to the bearers are used, whereby the bearers have, at one or both ends, holding plates which can be fixed in position, to obtain an earthquake-proof design, particularly for use in nuclear power stations, at least two neighboring bearers are braced together to form a stiff elementary unit of the bearing structure, and the holding plates are designed to be fixed in position with the intermediate insertion of spring elements, effective in all directions, and absorber elements, effective in one direction, whereby the spring and absorber elements, retain their function in a minimum range of 268° K. to 470° K. and the bearing layers have a load capacity of 5 kp/cm² (approx. 0.5 n/mm²) at 473° K.

16 Claims, 10 Drawing Figures

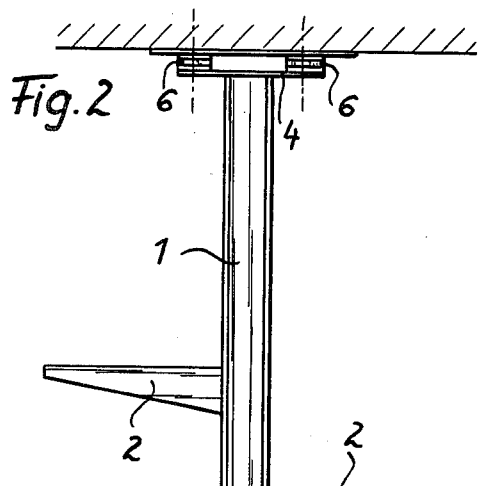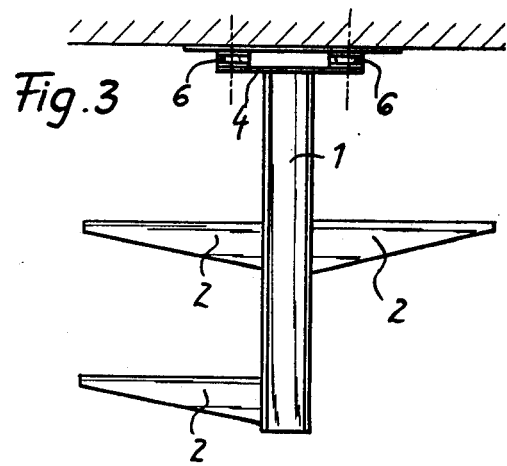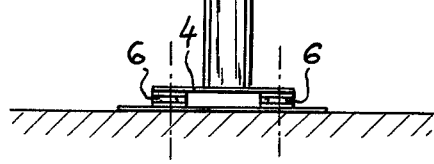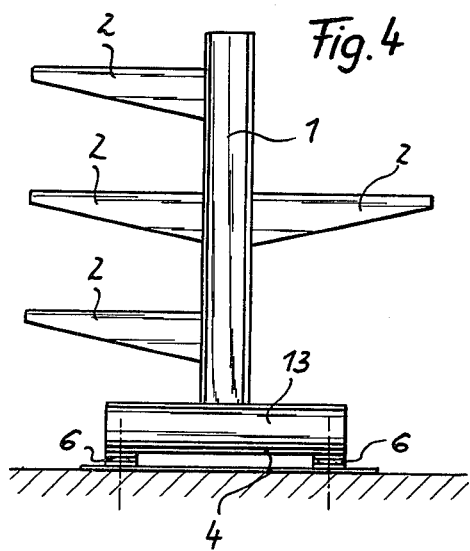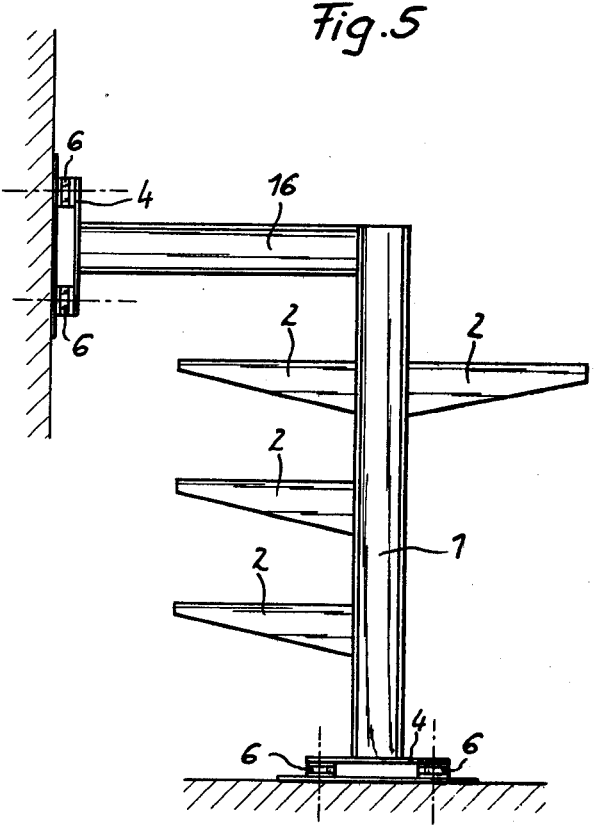

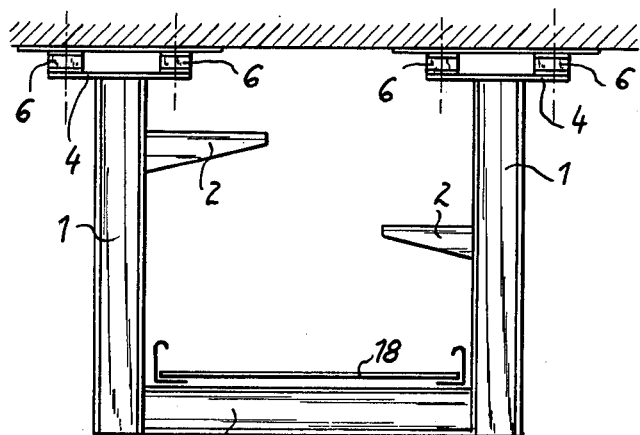
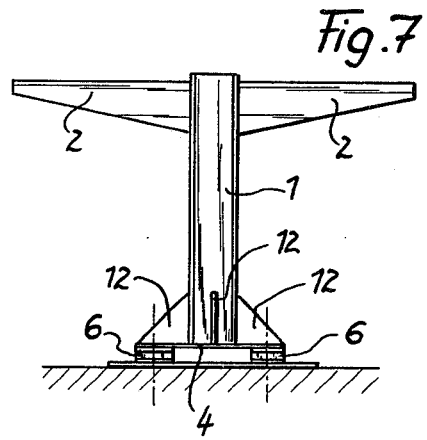
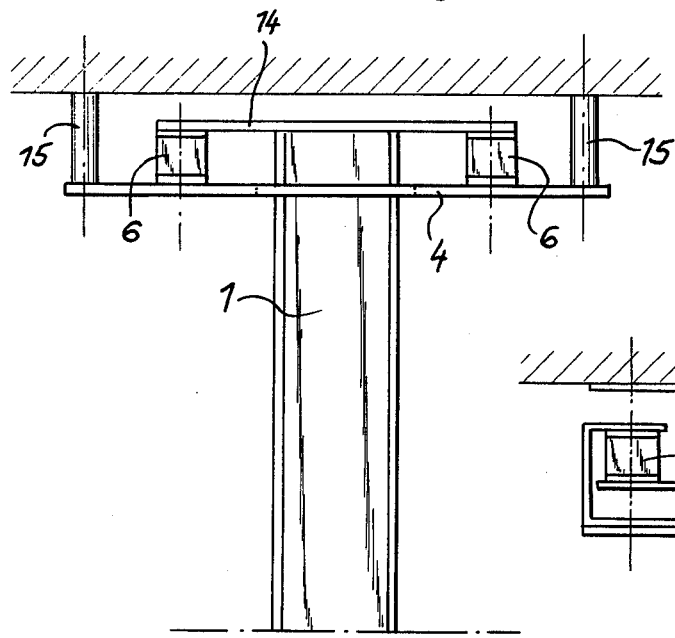
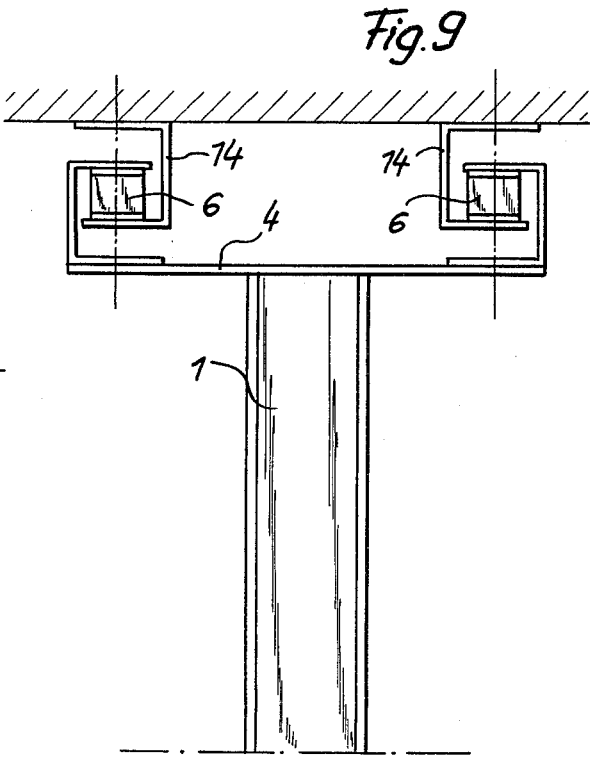

CABLE BEARER SYSTEM

This invention refers to a cable bearer system, earthquakeproof, for atomic power stations and similar, consisting of, in particular, I-shaped bearers arranged vertically at intervals one behind the other in the direction of the cable and several brackets fixed to the bearer which stand out horizontally at the sides. The bearer has holding plates at one or both ends which can be fastened to the building construction.

In earlier systems of this type the bearers were fastened on either side to the building construction by inserting wall-plugs of considerable length, e.g. 200 mm, at appropriate intervals in groups in the concrete ceiling and/or floors, and the holding plates were fastened there by threaded bolts.

It is also usual to hang the bearers or to use short stands. The bearers are also fastened to other bearing constructions, e.g. steel bearers.

However these constructions are unsuitable for use in earthquake-proof nuclear power station constructions. The forces produced by the earthquake demand particularly strong and long safety plugs as the very strong attacking forces, in particular tensile forces, cannot be absorbed in any other way. The space between the plugs of a holding plate should be approximately 190 mm in accordance with existing regulations under application of M 12, whereby the space between neighbouring bearer plates with four wall plugs amounts to 19 mm, according to the opinion of the TH Darmstadt.

Furthermore the holding plates must be extremely large and strong.

The demands on the quality of the materials used are also extremely high.

All these demands are justified because, if the bearing system is subjected to earth tremors or quakes, the wall plugs are exposed to extremely high tensile forces. This has led to the situation in which suggestions have been made to cast large steel plates in the concrete ceiling and to fasten the bearing plates to these.

The amount of planning required for this would be awfully high, because the exact position of the bearers of the system would have to be determined at the very beginning of construction and, furthermore, an extremely exact placing of the steel plates would be necessary, so that the bearers could later be fastened in exactly the predetermined position. The variability of the system would thus be so limited that later alterations or additions would be practically impossible.

Note must also be taken of the fact that fitting wall-plugs of the above mentioned length necessitates a complicated procedure to locate the iron in the concrete.

The same amount of effort as for the cable bearer systems in nuclear power station construction is also required for the installation of ventilation and pipe lines.

The varying load conditions must be calculated for each fixture point and taken into account when installing the system.

Grid- or ladder-shaped shelves are fitted to the cable brackets before the individual cables are laid. This ensures an even distribution of the cable weight, carries off the operating heat of the cables and facilitates cable changing.

The above development would lead to unmanageable dimensions and an intolerable work load for designers and engineers.

Thus the problem was to create a cable bearing system of the type described at the beginning which is earthquake-proof, with less planning and engineering effort. The system should also consist of as small a number as possible of simple components.

In general, the invention suggests the following solution to this problem: to join the existing cable bearer system of brackets to a stiff unit and to fasten this unit via a sprung, oscillating absorbant system to the building construction.

In detail, the invention is to be seen in the fact that, in each case, at least two neighbouring bearers are braced together to form a stiff elementary unit of the bearing construction and that the holding plates are fastened to the building construction with intermediate spring elements, effective in all directions, and absorber elements, effective in one direction.

Contrary to the present technique, this is based on the knowledge that the fastening element should not be sufficiently large to take the required forces but that the forces must be kept as low as possible in the bearing points and reduced to the statically required proportions. It is particularly necessary that the transfer of momentum be avoided.

To achieve these effects, the spring elements should not be very stiff, but should facilitate greater vibration amplitude so that friction between the sheathings of the cables laid out on the bearing system is used to dissipate the kenetic energy. The absorber elements are planned as the main dissipators of energy.

To fulfil the requirements regarding temperature conditions in nuclear power station construction, the spring and absorber elements are designed to function in a minimum range of 268° K. to 470° K.

The design of spring elements and absorber elements and, in particular, placing them between the holding plates and building construction would be rather complicated if steel springs and similar were used, as these require a relatively large space, are expensive and do not have sufficient absorbing capacity.

It is therefore suggested, that at least one layer of rubber be fastened between the holding plate and building construction as a spring and absorber element.

This is already a big step in the right direction.

With consideration for the heat resistence required in nuclear power station construction it is particularly advantageous and an essential part of the invention that a layer of elastomer material is used as a spring and absorber element.

In particular it is preferable that an elastomer material such as chloroprene-rubber or a with rubber with fluoride content be used which can be subjected to continuous loads in a temperature range of 268° K. to 398° K. and at 458° K. for one hour.

Temperature requirements are normally such that the layer is resistant to temperatures between 268° K. and 398° K. (−5° C. and 125° C.) in continuous operation and also to temperatures of 458° K. (185° C.) for up to one hour without losing their function.

For example, a chloroprene-rubber material, consisting of 60% chloroprene-rubber and up to 20 filler material, is used with success.

The composition is such that the layer is then resistent to the required temperature loads.

The elastomer material in particular also has high absorbing qualities, so that the layer has an absorbing capacity of at least 10%.

One possible and preferable design consists of the rubber or elastomer layer having a steel plate with standing out, threaded bolts vulcanized on to the areas corresponding to the holding plate and the building construction.

The force constant of this layer as regards horizontal movement depends on sliding module G, on the height of the elastomer cushion and on its sectional area. The constant for vertical movement is about 10 times higher and depends on the relation of the free to the bound surface of the cushion.

It is also intended to use two layers per holding plate.

For this the holding plate can be rectangular in design and has its layers at either end.

It has also proved advantageous to give the layers a bearing capacity of $5^{kp}/cm^2$ (approx. $0.5^N/mm^2$) at 473° K.

If the layers have adequate proportions, the loads can be carried easily.

A desirable further development consists of stiffening an elementary cell by joining the neighbouring bearers together with flat rods.

It is also intended that numbers of elementary units should be joined together at intervals in a grid system.

Each elementary cell only is braced, while the individual elementary cells are not braced to each other.

It is also possible to hang the bearers.

A further development is seen in fastening the layers indirectly to the building construction using an intermediate profile bar (FIGS. 9 and 10).

One version is characterized by the fact that the shaped bars or the part of the shaped bars which can be fastened to the ceiling is formed as an open C shape. The bearing layer is fastened to the inside of the side of the shaping opposite the side which is fixed to the ceiling. The holding plate of the bearer is placed on the free surface of the layer facing the inside of the profile and is fastened there.

With this version the bearing layer at the ceiling or on the upper holding plate is only statically loaded when under pressure. This is particularly advantageous with hanging bearers.

One variation is characterized by the fact that when the bearer is fastened in an upright position (FIGS. 4 and 6), the holding plate has a large surface and, in particular, triangular reinforcement between the holding plate and the bearers.

It is particularly advantageous if, in the outer elementary units of any one bearing field, the bearers of the last cell are reinforced by angular shapings.

Mounting is easier if the angular or flat shaping has at the end and/or the bearers at the appropriate fixing points, holes to take the high-tensile screws.

The design in accordance with the invention has many advantages, some of which are to be explained here.

Thanks to the arrangement of the elastomer layers, the wall plugs and bolts are subject to only negligibly low bending momentum.

Even under loading conditions caused by earthquakes, the wall-plugs are subjected to practically no other tensile forces than the static forces. As a result the wall plugs can be smaller, in particular the spaces between the plugs and between the groups can be smaller.

The forces of tension and pressure on the wall plugs do not exceed the static forces.

The only real dynamic forces exerted on the wall plugs are through shearing stress.

As a result the drill hole depths for the wall plugs and the length of the wall plugs can be reduced. This leads to a considerable saving of labour as the search for iron in the concrete in particular is greatly simplified.

The holding plates previously used in nuclear power station construction for cable bearer systems, ventilations and pipe lines, can be reduced in surface and strength, whereby static-dynamic advantages are obtained in their calculation, in building design and in engineering. As the space requirements are now much lower, it is easier to coordinate the individual structures. Nor is it any longer difficult to move lines of cables later on.

All these effects are the result of inserting the elastomer layer with its high absorbant qualities, its spring behaviour in all directions subjected to load and its heat resistance up to 473° K., in combination with the stiffening of the bearer systems.

Thus the pushing energy which has to be taken up is practically changed into kenetic energy and dissipated by the absorbing action of the material of the bearing layer.

The main demand on the cable bearer system is that after an earthquake, the function of the electrical installation is maintained to enable the reactor to be switched off without risk.

Applicable examples of the invention are shown in the drawings and described in detail below.

FIGS. 2 to 7 show various cable bearer forms in fragmentary, elevational view.

FIGS. 9 and 10 show two further detail variations in vertical view.

The cable bearer system, earthquake-proof, for nuclear power stations and similar consists of I-shaped bearers arranged in the direction of the cable line, vertically, one behind the other, at intervals of 150 cm 1 and several brackets fastened to the bearers horizontally at the sides 2. The latter can be fastened to bearers 1 on both sides and/or on one side. Ladder-shaped cable bearing shelves 3 are placed onto the brackets 2. The bearers 1 have holding plates at one end (FIGS. 3,4,6,7) or at both ends (FIGS. 1,2,5), which can be fastened to the building construction.

Figure 1:
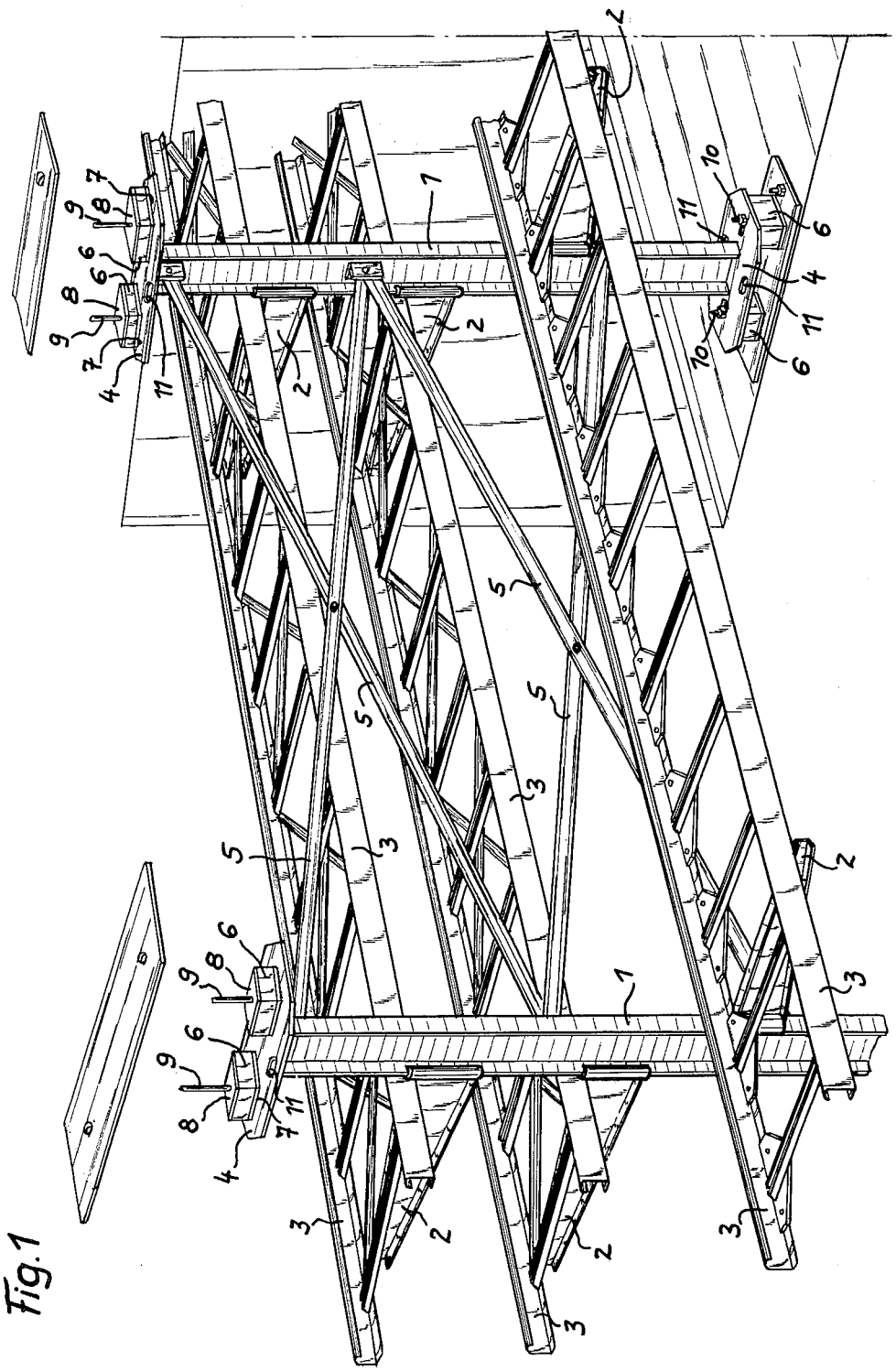
FIG. 1 is an elementary unit of a cable bearer system illustrated in perspective.
Figure 8:
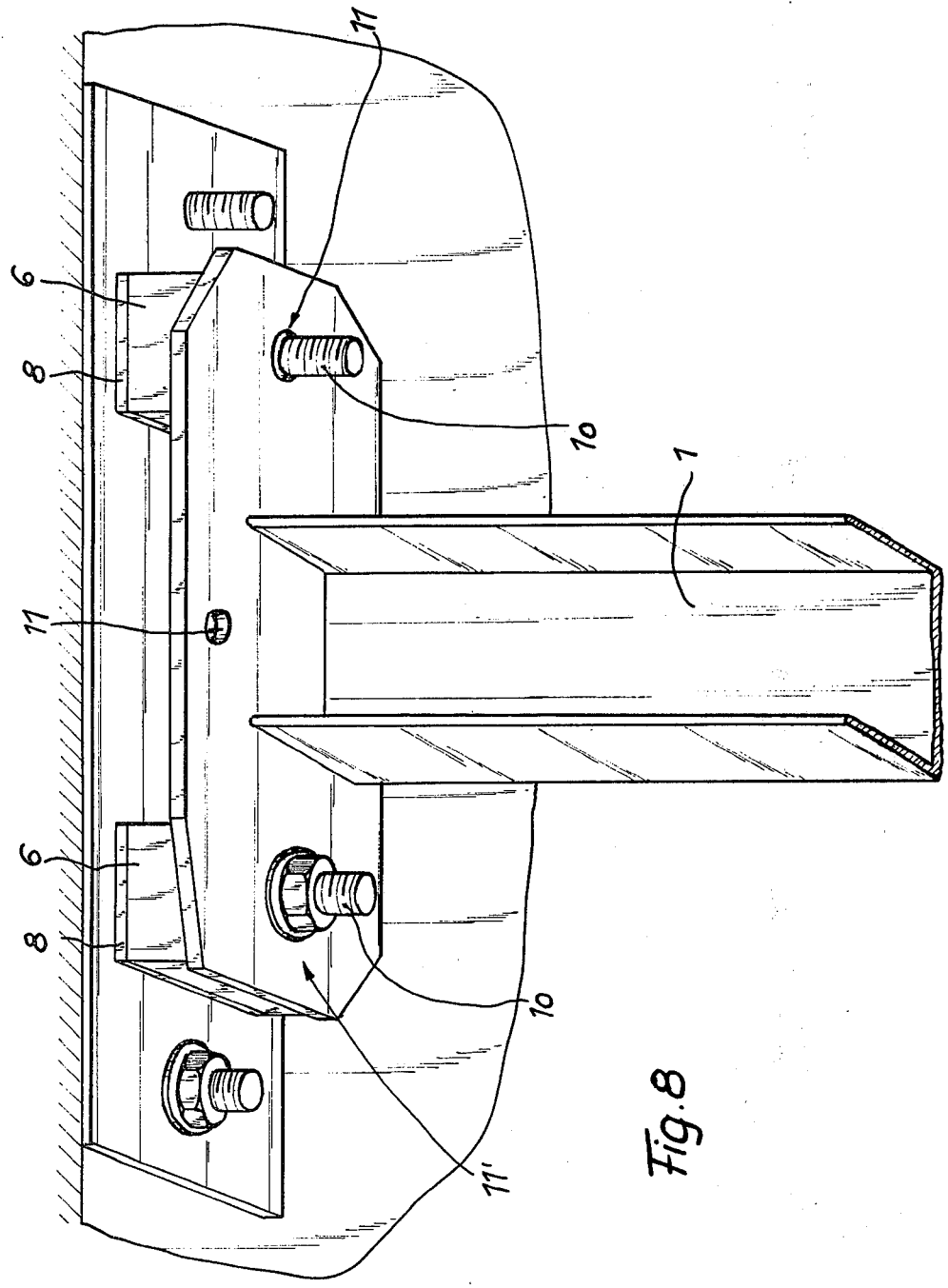
FIG. 8 shows an enlarged fragmentary underside detail in perspective.

Two directly neighbouring bearers 1 are braced together with crossed flat bars 5 to form a stiff elementary unit (FIG. 1). The flat bars 5 are joined together where they cross and at their ends to the bearers 1 with high-tensile screws.

Layers 6 of elastomer materials are fitted to the holding plates 4 which, in turn, are fastened to the building construction. These layers 6 have steel plates 7,8 vulcanized to their upper and lower sides. A threaded bolt 9 which fits into a wall-plug in the building construction extends upwardly from the upper steel plate 8. A bolt 10 is fitted to the lower plate 7 and can be fitted into corresponding holes 11 in the holding plate 10 and fastened there with a nut 11. Instead of the threaded bolt, the steel plate 8 can also be fitted with threaded holes to receive screws. The elastomer cushion which constitutes bearing layer 6 is a highly absorbant spring, effective in all directions. The tearing strength of layer 6 is at 293° K. at about $170^{kp}/cm^2$. It is heat resistant to at least 473° K. and can be joined to metal well. To obtain a good suspension and absorber effect and to thus prevent earth-quake damage to the bearer system, two layers 6 per holding plate 7 are sufficient. The amount of space between the layers 6 is governed by the regulations for the spacing of wall-plugs. Actually a single, correctly dimensioned layer 6 would be sufficient, but safety regulations require on a multiple arrangement.

One elementary unit, as shown in FIG. 1, is coupled to another unit as with flat bars, so that a plurality of such units arranged at regular intervals form a cable bearing system.

When the bearers 1 are fastened at both ends as shown in FIG. 1, the lower layer 6 takes, in the main, static pressure forces only, and the upper layer static tensile forces. Dynamic load conditions are taken up by layers 6, whereby shearing forces only are transferred to screws 9,10 and/or the wall-plugs.

If the bearers are fastened at the bottom only (FIG. 4 and 7) reinforcement is required between holding plate 4 and bearer 1 in the form of angle members 12 (FIG. 7) or iron profiles 13. In this case a larger space between the bearing layers, as shown in FIG. 4, is also better. No reinforcements are required for hanging constructions (FIGS. 3,6).

In order to subject the upper layer 6 mainly to pressure forces only, fitting has been designed as shown in FIG. 9 and 10. One or more profile bars 14,15 are fastened to the ceiling; the bars are shaped as an open C as shown in FIG. 9. One side is screwed on to the ceiling and the other side holds layer 6 on its inner surface. Another C-shaped bar is fastened to the upper side of layer 6 and, with its other side, to the holding plate 4, so that layer 6 can take up and absorb all vibrations and shocks. In FIG. 10 the holding plate 4 is hung into a U-shaped bar 15 with intermediate use of layer 6.

The invention is not restricted to the examples given, but can be varied in many ways. Examples illustrating this are the variations shown in FIGS. 5 and 6. In FIG. 5 the bearer 1 is shown fastened to a side wall by a horizontal support shaping 16 fixed at one side. The holding plate 4 is fixed at the free end of the support 16.

FIG. 6 shows two hanging bearers 1 joined together by a bearing part 17. A cable channel is laid out on the bearing part 17.

I claim:

1. Cable bearer system for rendering earthquake-proof nuclear power stations and, the like consisting of I-shaped bearers arranged vertically at intervals rearwardly of one another in the linear direction of the cable system and a plurality of brackets fixed to the bearers of the bearer system and which extend horizontally from the bearer sides, the bearers having holding plates at their ends which can be fastened to an adjacent building construction and at least two adjacent bearers being hung and braced together to form a rigid unit so that the holding plates are fastened to the building construction by intermediate spring elements which are omnidirectionally effective and absorber elements which are unidirectionally effective.

2. Cable bearer system as in claim 1 wherein the spring and absorber elements are designed to function in a minimum range of at least 268° K. to 470° K.

3. Cable bearer system as in claim 1 wherein at least one layer of rubber is fastened between each holding plate and the building construction and serves as a spring element.

4. Cable bearer system as in claim 1 wherein the spring element is elastomeric.

5. Cable bearer system as in claim 4 wherein the elastomeric element is a chloroprene rubber or a rubber with a fluoride content which can be subjected to continual loads at temperatures ranging from 268° K. to 398° K. and can be subjected to a load at 458° K. for 1 hour.

6. Cable bearer system as in claim 1 wherein the elements have an absorption of at least 10%.

7. Cable bearer system as in claim 1 wherein a steel plate provided with externally extending threaded bolts are vulcanized to the surfaces of the elastomeric elements and to the holding plates of the building construction.

8. Cable bearer system as in claim 7 wherein each holding plate has two layers.

9. Cable bearing system as in claim 1 wherein the layer elements have a bearing strength of $5^{kp}.cm^2$ (approx. $0.5^N/mm^2$) at 473° K.

10. Cable bearer system as in claim 1 wherein the adjacent bearers are braced together with flat bars to form an elementary unit.

11. Cable bearer system as in claim 10 wherein outer elementary units of an array of bearers have the bearers of the last unit stiffened.

12. Cable bearer system as in claim 10 wherein a plurality of elementary units are joined at intervals to each other to form a grid.

13. Cable bearer system as in claim 1 wherein the elements are fastened indirectly to the building construction by an intervening intermediate shaped bar.

14. Cable bearer system as in claim 13 wherein the shaped bar is fixed to the building ceiling and is formed in an open C-shape.

15. Cable bearer system as in claim 1 wherein the holding plates of the bearers are fastened at their base only and have a large surface area and triangular reinforcements fitted between the holding plates and the bearers.

16. Cable bearer system as in claim 1 wherein angular bearing connecting members interconnecting the bearers and have holes at their crossing points to receive high-tensile fastening screws.

* * * * *